US011703136B2

(12) United States Patent
Mimura et al.

(10) Patent No.: US 11,703,136 B2
(45) Date of Patent: Jul. 18, 2023

(54) CONTROL VALVE

(71) Applicant: YAMADA MANUFACTURING CO., LTD., Kiryu (JP)

(72) Inventors: Tetsuya Mimura, Kiryu (JP); Akifumi Ozeki, Kiryu (JP)

(73) Assignee: YAMADA MANUFACTURING CO., LTD., Kiryu (JP)

( * ) Notice: Subject to any disclaimer, the term of this patent is extended or adjusted under 35 U.S.C. 154(b) by 0 days.

(21) Appl. No.: 17/677,351

(22) Filed: Feb. 22, 2022

(65) Prior Publication Data

US 2022/0298957 A1    Sep. 22, 2022

(30) Foreign Application Priority Data

Mar. 22, 2021  (JP) ................................. 2021-047369
Dec. 8, 2021  (JP) .................................. 2021-199313

(51) Int. Cl.
*F16K 11/085* (2006.01)
*F16K 5/20* (2006.01)
*F16K 11/087* (2006.01)
*F01P 7/14* (2006.01)
*F16K 11/06* (2006.01)

(52) U.S. Cl.
CPC .......... *F16K 11/0856* (2013.01); *F16K 5/205* (2013.01); *F16K 11/087* (2013.01); *F01P 2007/146* (2013.01); *F16K 11/06* (2013.01)

(58) Field of Classification Search
CPC ......... F01P 2007/146; F01P 7/16; F01P 7/14; F01P 7/165; F16K 11/0856; F16K 11/085; F16K 11/0876; F16K 11/0873; F16K 11/087; F16K 5/18; F16K 5/188; F16K 5/205; F16K 5/20; F16K 25/02; F16K 25/00; F16K 41/003
See application file for complete search history.

(56) References Cited

U.S. PATENT DOCUMENTS

| 1,679,779 | A | * | 8/1928 | Oberhuber | ............... F16K 1/36 |
| | | | | | 277/648 |
| 3,617,027 | A | * | 11/1971 | Scaramucci | .......... F16K 5/0668 |
| | | | | | 251/315.01 |
| 9,945,283 | B2 | * | 4/2018 | Muizelaar | ............. F16K 31/042 |

(Continued)

FOREIGN PATENT DOCUMENTS

| FR | 2827360 A1 * | 1/2003 | ......... B60H 1/00485 |
| FR | 2849485 A1 * | 7/2004 | ......... B60H 1/00485 |

(Continued)

*Primary Examiner* — David Colon-Morales
(74) *Attorney, Agent, or Firm* — Rankin, Hill & Clark LLP

(57) ABSTRACT

A control valve 8 according to the present disclosure includes a casing 21 in which an outlet for a liquid is formed and the liquid is accommodated, a rotor 22 rotatably accommodated in the casing 21 and having a communication port communicating with the outlet, and a sliding ring 131 having a sliding surface 141a sliding on an outer surface of the rotor in a state of being disposed inside the outlet and causing the outlet and the communication port to communicate with each other according to a rotation position of the rotor 22, in which a liquid holding portion for holding the liquid between the sliding surface 141a and the liquid holding portion is provided on the outer surface of the rotor 22, and the liquid holding portion has a recessed portion for accommodating the liquid.

4 Claims, 8 Drawing Sheets

(56) References Cited

U.S. PATENT DOCUMENTS

| | | | | |
|---|---|---|---|---|
| 10,352,460 B2* | 7/2019 | Jang | ............... | F16K 5/0678 |
| 10,359,138 B2* | 7/2019 | Bareis | ............... | F01P 7/14 |
| 10,480,661 B2* | 11/2019 | Park | ............... | F16K 1/42 |
| 10,508,748 B2* | 12/2019 | Ozeki | ............... | F01P 11/16 |
| 10,513,968 B2* | 12/2019 | Yumisashi | ............... | F16K 5/06 |
| 10,808,850 B2* | 10/2020 | Abouelleil | ............... | F16K 5/0407 |
| 2006/0214017 A1* | 9/2006 | Vacca | ............... | F16K 5/188 |
| | | | | 123/41.1 |
| 2015/0276065 A1* | 10/2015 | Yoshida | ............... | F16K 3/246 |
| | | | | 251/333 |
| 2019/0003602 A1* | 1/2019 | Ozeki | ............... | F16K 5/168 |

FOREIGN PATENT DOCUMENTS

| | | | | | |
|---|---|---|---|---|---|
| GB | 1507255 A | * | 4/1978 | ......... | B60H 1/00485 |
| JP | 2016-114125 | | 6/2016 | | |

* cited by examiner

CONTROL VALVE

BACKGROUND OF THE INVENTION

Field of the Invention

The present disclosure relates to a control valve.

Priority is claimed on Japanese Patent Application No. 2021-047369 filed in Japan on Mar. 22, 2021 and Japanese Patent Application No. 2021-199313 filed in Japan on Dec. 8, 2021, the contents of which are incorporated herein by reference.

Description of Related Art

In a cooling system that cools an engine using cooling water, a control valve that controls the flow of the cooling water to each flow path is provided at a branch portion to each flow path (radiator flow path or the like).

The control valve includes a casing in which a cooling water outlet is formed, a rotor that has a communication port capable of communicating with the outlet and is rotatably accommodated in the casing, and a sliding ring that is disposed in the outlet and slides on an outer peripheral surface of the rotor (for example, refer to Japanese Unexamined Patent Application, First Publication No. 2016-114125).

According to this configuration, by rotating the rotor, communication and blocking between the outlet and the communication port through the sliding ring can be switched. When the communication port and the outlet communicate with each other, a coolant flowing in the rotor flows out from the control valve through the communication port, the sliding ring, and the outlet. As a result, the cooling water is distributed to one or more flow paths according to the rotation of the rotor.

SUMMARY OF THE INVENTION

For early warming up of an engine, it is preferable to keep the inside of a cooling system in a zero-flow state from the start of starting the engine to the end of warming up. The zero-flow state is a state (a state in which cooling water does not flow into a radiator flow path or the flow of cooling water in the radiator flow path is small) in which cooling water stays at least in an engine flow path. Therefore, in order to realize the early warming up, it is necessary to improve sealing performance between a rotor and a sliding ring.

However, when adhesion between the sliding ring and the rotor is improved by reducing a surface roughness of the rotor in order to secure the sealing performance, sliding resistance generated between the rotor and the sliding ring when rotating the rotor increases. As a result, a torque (rated torque) required to rotate the rotor increases, which leads to an increase in a size of an actuator and an increase in power consumption.

The present disclosure provides a control valve that achieves both improved sealing performance between the rotor and the sliding ring and ensuring sliding property between the rotor and the sliding ring.

In order to solve the above problems, the present disclosure adopts the following aspects.

(1) According to an aspect of the present disclosure, there is provided a control valve including: a casing in which an outlet for a liquid is formed and the liquid is accommodated; a rotor having a communication port communicatable with the outlet and rotatably accommodated in the casing; and a sliding ring having a sliding surface sliding on an outer surface of the rotor in a state of being disposed in the outlet and causing the outlet and the communication port to communicate with each other according to a rotation position of the rotor. A liquid holding portion for holding the liquid between the sliding surface and the liquid holding portion is provided on the outer surface of the rotor. The liquid holding portion has a recessed portion for accommodating the liquid.

In the above configuration, the liquid holding portion for holding the liquid between an outer peripheral surface of a valve cylinder and the sliding surface of the sliding ring is provided on the outer peripheral surface of a valve cylinder.

According to this configuration, the liquid that has entered a minute gap between the outer surface of the rotor and the sliding surface of the sliding ring is accommodated in the recessed portion. As a result, a liquid film is likely to be formed between the outer surface of the rotor and the sliding surface of the sliding ring due to the influence of surface tension or the like acting between the liquid holding portion and the sliding surface. As a result, the liquid film can seal between the rotor and the sliding ring. Accordingly, the liquid does not easily leak inside the sliding ring through between the rotor and the sliding ring. Therefore, according to the above configuration, it becomes easy to maintain a zero-flow state of a cooling system, and it is possible to realize early warming up of the vehicle.

According to the above configuration, an area where the rotor and the sliding ring come into direct contact with each other can be reduced by the liquid film formed between the rotor and the sliding ring. Accordingly, it is possible to reduce the adhesion between the rotor and the sliding ring due to the recessed portion in the liquid holding portion. Therefore, it is possible to reduce the sliding resistance during rotation of the rotor and reduce the rotational torque. Therefore, it is possible to suppress an increase in a size of an actuator and an increase in power consumption.

Therefore, according to the above configuration, it is possible to provide the control valve that achieves both improvement of sealing performance between the rotor and the sliding ring and ensuring the sliding property between the rotor and the sliding ring.

In the above configuration, since the sealing performance and sliding property can be ensured by processing the recessed portion on the outer surface of the rotor, it is possible to improve durability as compared with the conventional configuration in which sliding coating is applied to the outer peripheral surface of the rotor, for example. Therefore, the sealing performance and the sliding property can be ensured for a long period of time.

(2) In the control valve according to the (1), the recessed portion may extend in a circumferential direction around a rotation axis of the rotor.

In the above configuration, since the recessed portion extends along a rotation direction of the rotor, when the rotor rotates, a top portion of the outer peripheral surface of the rotor located between the adjacent recessed portions moves along the rotation direction of the rotor. That is, at any position on the sliding surface of the sliding ring, it is possible to prevent the recessed portion and the top portion located between the two recessed portions from alternately passing as the rotor rotates. Therefore, abnormal wear of the sliding surface of the sliding ring can be suppressed.

(3) In the control valve according to (2), the rotor may be formed in a tubular shape extending coaxially with the rotation axis. A groove extending spirally in an axial direction along the rotation axis as the groove extends to one side in the circumferential direction may be formed on an outer peripheral surface of the rotor. The groove may be formed by arranging a plurality of the recessed portions in the axial direction in a cross-sectional view along the axial direction.

In the above configuration, the recessed portion is formed by a groove spirally extending in the axial direction along the rotation axis as extending to one side in the circumferential direction on the outer peripheral surface of the rotor.

According to this configuration, the recessed portion can be easily formed on the outer surface of the rotor by performing lathe processing or the like on the rotor after injection molding. In particular, in the above configuration, the machining can be completed while the outer surface of the rotor is rougher than in the conventional case, and thus, a cutting time can be reduced as compared with the case where the surface roughness of the outer surface of the rotor is reduced in order to improve the sealing performance. As a result, it is possible to improve the manufacturing efficiency and reduce the manufacturing cost.

(4) In the control valve according to any one of (1) to (3), when a surface roughness of the outer surface is defined as a rotor surface roughness and a surface roughness of the sliding surface is defined as a ring surface roughness. The rotor surface roughness may be larger than the ring surface roughness.

In the above configuration, by making the rotor surface roughness of the rotor larger than the ring surface roughness, the liquid can be more reliably held in the liquid holding portion.

(5) In the control valve according to (4), the rotor surface roughness may be in the range of 11 μm<X≤45 μm in terms of ten-point average roughness Rz.

Since the rotor surface roughness is in the range of 11 μm<X≤45 μm in terms of the ten-point average roughness Rz, it is possible to achieve both sealing performance and torque reduction.

Specifically, since the rotor surface roughness is larger than the lower limit value, the sliding resistance acting between the rotor and the sliding ring can be reduced, and the rotational torque can be reduced. Further, since the rotor surface roughness is equal to or less than the upper limit value, the sealing performance between the rotor and the sliding ring can be ensured especially in the zero-flow state (until the warm-up is completed).

According to the present disclosure, it is possible to provide a control valve that achieves both improvement in sealing performance between the rotor and the sliding ring and suppression of wear between the rotor and the sliding ring.

DETAILED DESCRIPTION OF THE INVENTION

Next, an embodiment of the present disclosure will be described with reference to the drawings. In the following description, a case where a control valve of the present embodiment is adopted in a cooling system for cooling an engine using cooling water will be described.

[Cooling System 1]

Figure 1:
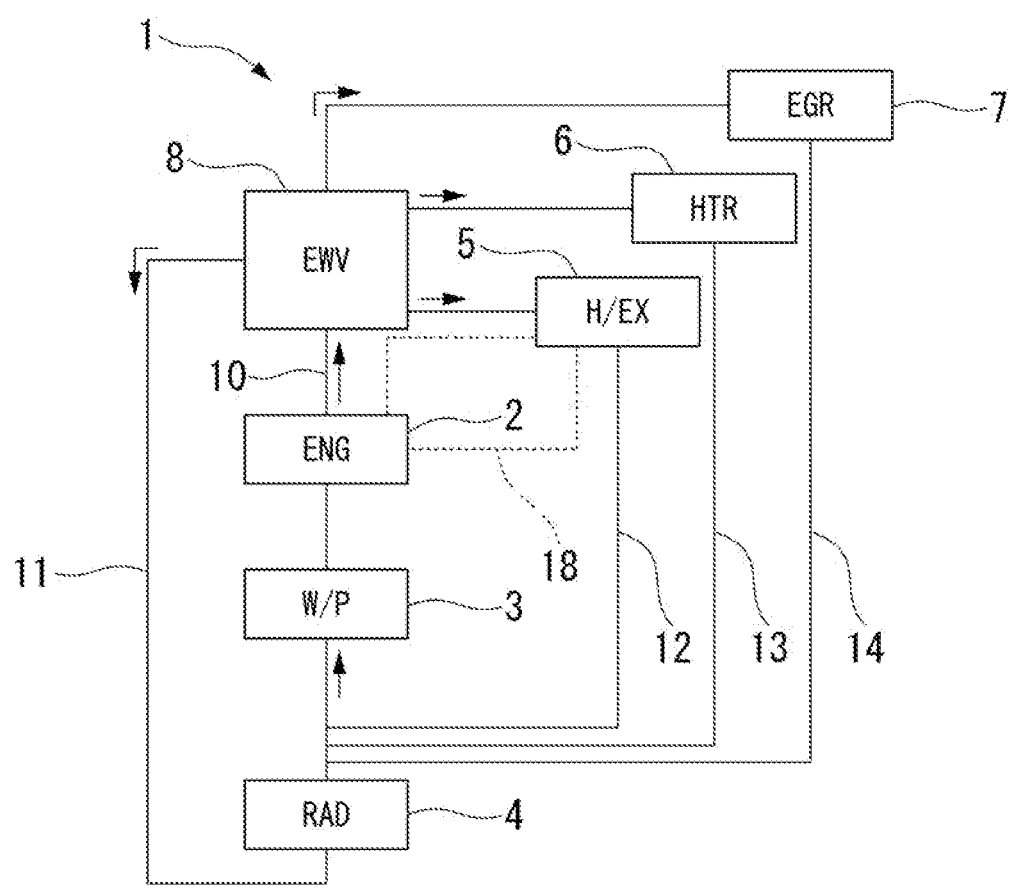
FIG. 1 is a block diagram of a cooling system according to an embodiment.

FIG. 1 is a block diagram of a cooling system 1.

As shown in FIG. 1, the cooling system 1 is mounted on a vehicle having at least an engine as a vehicle drive source. The vehicle may be a hybrid vehicle, a plug-in hybrid vehicle, or the like, in addition to a vehicle having only an engine.

In the cooling system 1, an engine 2 (ENG), a water pump 3 (W/P), a radiator 4 (RAD), a heat exchanger 5 (H/EX), a heater core 6 (HTR), an EGR cooler 7 (EGR), and a control valve 8 (EWV) are connected by each of flow paths 10 to 14.

The water pump 3, the engine 2, and the control valve 8 are connected in order on the main flow path 10 from upstream to downstream. In the main flow path 10, the cooling water passes through the engine 2 and the control valve 8 in order by the operation of the water pump 3.

Each of a radiator flow path 11, a warm-up flow path 12, an air conditioning flow path 13, and an EGR flow path 14 is connected to the main flow path 10. The radiator flow path 11, the warm-up flow path 12, the air conditioning flow path 13, and the EGR flow path 14 connect the upstream portion of the water pump 3 of the main flow path 10 and the control valve 8.

The radiator 4 is connected to the radiator flow path 11. In the radiator flow path 11, heat exchange between the cooling water and the outside air is performed in the radiator 4.

A heat exchanger 5 is connected to the warm-up flow path 12. Engine oil circulates between the heat exchanger 5 and the engine 2 through an oil flow path 18. In the warm-up flow path 12, heat exchange between the cooling water and the engine oil is performed in the heat exchanger 5. That is, the heat exchanger 5 functions as an oil warmer when a water temperature is higher than an oil temperature to heat the engine oil. Meanwhile, the heat exchanger 5 functions as an oil cooler when the water temperature is lower than the oil temperature to cool the engine oil.

The heater core 6 is connected to the air conditioning flow path 13. The heater core 6 is provided, for example, in a duct (not shown) of an air conditioner. In the air conditioning flow path 13, heat exchange between the cooling water and the air-conditioned air flowing in the duct is performed in the heater core 6.

The EGR cooler 7 is connected to the EGR flow path 14. In the EGR flow path 14, heat exchange between the cooling water and the EGR gas is performed in the EGR cooler 7.

In the cooling system 1 described above, the cooling water that has passed through the engine 2 in the main flow path 10 flows into the control valve 8 and then is selectively distributed to each of the flow paths 11 to 13 by the operation of the control valve 8.

<Control Valve 8>

Figure 2:
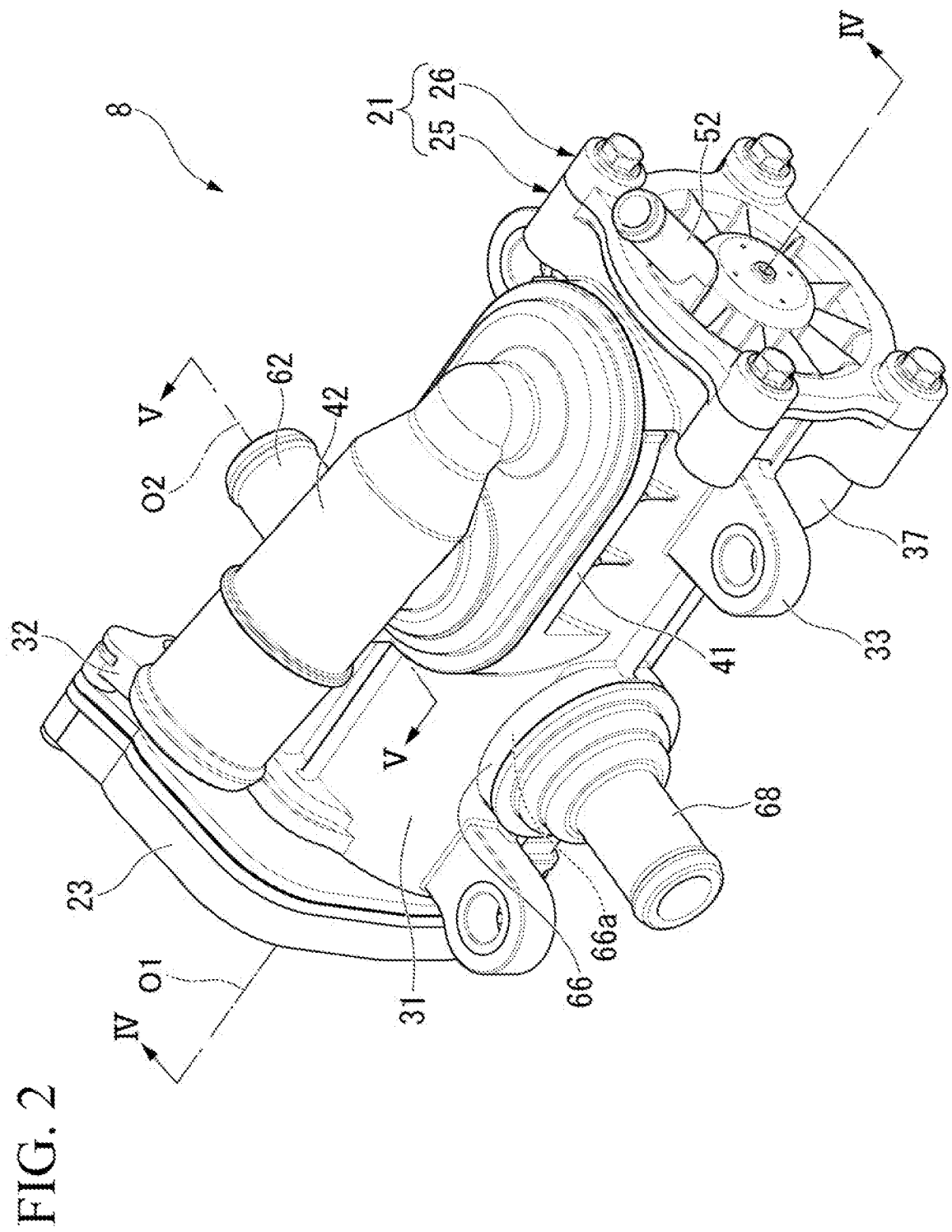
FIG. 2 is a perspective view of a control valve according to the embodiment.
Figure 3:
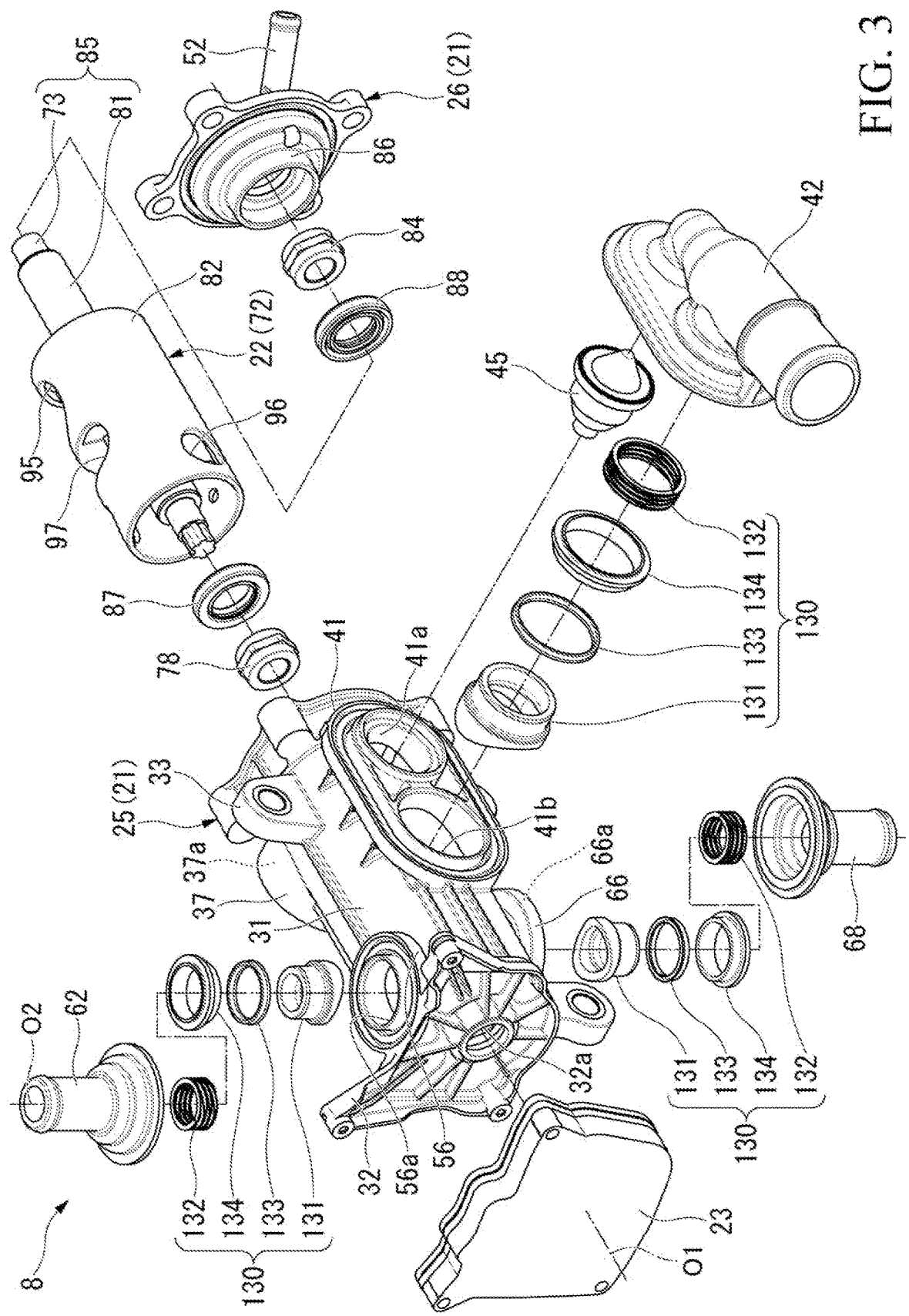
FIG. 3 is an exploded perspective view of the control valve according to the embodiment.

FIG. 2 is a perspective view of the control valve 8. FIG. 3 is an exploded perspective view of the control valve 8.

As shown in FIGS. 2 and 3, the control valve 8 includes a casing 21, a rotor 22 (refer to FIG. 3), and a drive unit 23.

(Casing 21)

The casing 21 has a bottomed tubular casing main body 25 and a lid 26 that closes an opening portion of the casing main body 25. In the following description, a direction along an axis O1 of the casing 21 is simply referred to as a case axial direction. In the case axial direction, a direction toward the bottom wall portion 32 of the casing main body 25 with respect to a peripheral wall portion 31 of the casing main body 25 is referred to as a first side, and a direction toward the lid 26 with respect to the peripheral wall portion 31 of the casing main body 25 is referred to as a second side. A direction orthogonal to the axis O1 is called a case radial direction, and a direction around the axis O1 is called the case circumferential direction.

A plurality of attachment pieces 33 are formed on the peripheral wall portion 31 of the casing main body 25. Each attachment piece 33 protrudes outward from the peripheral wall portion 31 in the case radial direction. The control valve 8 is fixed in the engine room via, for example, each attachment piece 33. The position, number, and the like of each attachment piece 33 can be changed as appropriate.

Figure 4:
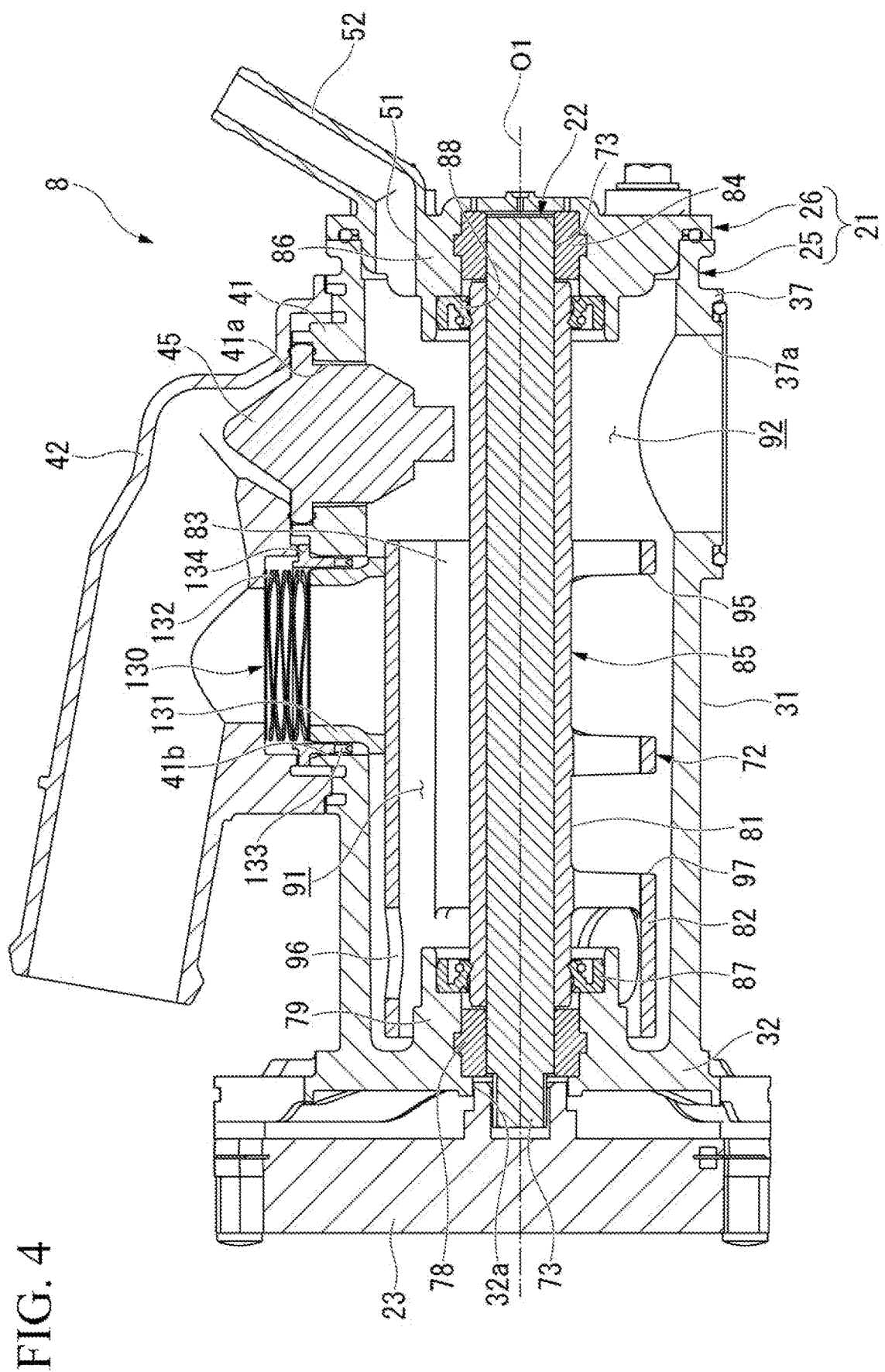
FIG. 4 is a cross-sectional view taken along line IV-IV of FIG. 2.

FIG. 4 is a cross-sectional view taken along line IV-IV of FIG. 2.

As shown in FIGS. 3 and 4, an inflow port 37 that bulges outward in the case radial direction is formed in a portion of the peripheral wall portion 31 located on the second side in the case axial direction. The inflow port 37 is formed with an inlet 37a (refer to FIG. 4) that penetrates the inflow port 37 in the case radial direction. The inlet 37a communicates with the inside and outside of the casing 21. The main flow path 10 (refer to FIG. 1) is connected to the opening end surface (outer end surface in the case radial direction) of the inflow port 37.

As shown in FIG. 4, a radiator port 41 that bulges outward in the case radial direction is formed at a position of the peripheral wall portion 31 that faces the inflow port 37 in the case radial direction with the axis O1 therebetween. The radiator port 41 is formed with a fail opening 41a and a radiator outlet 41b arranged side by side in the case axial direction. The fail opening 41a and the radiator outlet 41b each penetrate the radiator port 41 in the case radial direction. In the present embodiment, the fail opening 41a faces the inlet 37a in the case radial direction. The radiator outlet 41b is located on the first side in the case axial direction with respect to the fail opening 41a.

A radiator joint 42 is connected to an opening end surface (outer end surface in the case radial direction) of the radiator port 41. The radiator joint 42 connects between the radiator port 41 and the upstream end portion (refer to FIG. 1) of the radiator flow path 11. The radiator joint 42 is welded (for example, vibration welding or the like) to the opening end surface of the radiator port 41.

A thermostat 45 is provided in the fail opening 41a. That is, the thermostat 45 faces the inlet 37a in the case radial direction. The thermostat 45 opens and closes the fail opening 41a according to the temperature of the cooling water flowing in the casing 21.

In the lid 26, an EGR joint 52 is formed at an opening edge of an EGR outlet 51. The EGR joint 52 is formed in a tubular shape extending outward in the case radial direction toward the second side in the case axial direction. The EGR joint 52 connects between the EGR outlet 51 and the upstream end portion (refer to FIG. 1) of the EGR flow path 14. In the present embodiment, the EGR joint 52 is integrally formed with the lid 26. However, the EGR joint 52 may be formed separately from the lid 26. The EGR outlet 51 and the EGR joint 52 may be provided on the peripheral wall portion 31 or the like.

As shown in FIG. 3, in the peripheral wall portion 31, a warm-up port 56 that bulges outward in the case radial direction is formed in a portion located on the first side with respect to the radiator port 41 in the case axial direction. The warm-up port 56 is formed with a warm-up outlet 56a that penetrates the warm-up port 56 in the case radial direction. A warm-up joint 62 is connected to the opening end surface of the warm-up port 56. The warm-up joint 62 connects the warm-up port 56 and the upstream end portion of the warm-up flow path 12 (refer to FIG. 1). The warm-up joint 62 is welded (for example, vibration welding or the like) to the opening end surface of the warm-up port 56.

As shown in FIG. 2, an air conditioning port 66 is formed at a position of the peripheral wall portion 31 between the radiator port 41 and the warm-up port 56 in the case axial direction and displaced by about 180° with respect to the warm-up port 56 in the case circumferential direction. The air conditioning port 66 is formed with an air conditioning outlet 66a that penetrates the air conditioning port 66 in the case radial direction. An air conditioning joint 68 is connected to the opening end surface of the air conditioning port 66. The air conditioning joint 68 connects the air conditioning port 66 and the upstream end portion (refer to FIG. 1) of the air conditioning flow path 13. The air conditioning joint 68 is welded (for example, vibration welding or the like) to the opening end surface of the air conditioning port 66.

(Drive Unit 23)

As shown in FIG. 2, the drive unit 23 is attached to the bottom wall portion 32 of the casing main body 25. The drive unit 23 includes a motor, a deceleration mechanism, a control board, and the like (not shown).

(Rotor 22)

As shown in FIGS. 3 and 4, the rotor 22 is accommodated in the casing 21. The rotor 22 is formed in a cylindrical shape disposed coaxially with the axis O1 of the casing 21. The rotor 22 opens or closes each outlet (radiator outlet 41b, warm-up outlet 56a, and air conditioning outlet 66a) by rotating around the axis O1.

As shown in FIG. 4, the rotor 22 is configured such that an inner shaft 73 is insert-molded inside a rotor main body 72.

The inner shaft 73 is formed of a material (for example, a metal material) having a higher rigidity than the rotor main body 72 (for example, a resin material). The inner shaft 73 extends coaxially with the axis O1.

The rotor 22 may be integrally formed of, for example, a resin material or a metal material.

A first side end portion of the inner shaft 73 penetrates the bottom wall portion 32 in the case axial direction through a through hole 32a formed in the bottom wall portion 32. The first side end portion of the inner shaft 73 is rotatably supported by a first bush 78 provided on the bottom wall portion 32. Specifically, the bottom wall portion 32 is formed with a first shaft accommodating wall 79 toward the second side in the case axial direction. The first shaft accommodating wall 79 surrounds the through hole 32a. The first bush 78 is fitted into the first shaft accommodating wall 79.

A portion of the inner shaft 73 located on the first side with respect to the first bush 78 in the case axial direction is connected to the drive unit 23 at a portion located outside the bottom wall portion 32. As a result, power of the drive unit 23 is transmitted to the inner shaft 73.

A second side end portion of the inner shaft 73 is rotatably supported by a second bush 84 provided on the lid 26. Specifically, the lid 26 is formed with a second shaft accommodating wall 86 toward the first side in the case axial direction. The second shaft accommodating wall 86 surrounds the axis O1 inside the above-mentioned EGR outlet 51 in the case radial direction. The second bush 84 is fitted into the second shaft accommodating wall 86.

The rotor main body 72 surrounds the periphery of the inner shaft 73. The rotor main body 72 includes an outer shaft 81 connected to the inner shaft 73, a valve cylinder 82 that surrounds the periphery of the outer shaft 81, and a spoke 83 that connects the outer shaft 81 and the valve cylinders 82 to each other. The rotor main body 72 is preferably formed of a resin selected from the group consisting of polyphenylene sulfide (PPS), aromatic polyetherketone (PEEK) and polyamide (PA) as a main component.

The outer shaft 81 surrounds the inner shaft 73 over the entire periphery in a state where both end portions of the inner shaft 73 in the case axial direction are exposed. In the present embodiment, the outer shaft 81 and the inner shaft 73 constitute a rotating shaft 85 of the rotor 22.

A first lip seal 87 is provided in a portion of the first shaft accommodating wall 79 located on the second side with respect to the first bush 78 in the case axial direction. The first lip seal 87 seals between an inner peripheral surface of the first shaft accommodating wall 79 and an outer peripheral surface of the rotating shaft 85 (outer shaft 81).

A second lip seal 88 is provided in a portion of the second shaft accommodating wall 86 located on the first side with respect to the second bush 84 in the case axial direction. The second lip seal 88 seals between an inner peripheral surface of the second shaft accommodating wall 86 and an outer peripheral surface of the rotating shaft 85 (outer shaft 81).

The valve cylinder 82 is disposed coaxially with the axis O1. The valve cylinder 82 is disposed in the casing 21 at a portion located on the first side with respect to the inlet 37a in the case axial direction. The valve cylinder 82 is disposed at a position in the case axial direction so as to avoid the fail opening 41a and straddle the radiator outlet 41b, the warm-up outlet 56a, and the air conditioning outlet 66a. The inside of the valve cylinder 82 constitutes a flow passage 91 in which the cooling water flowing into the casing 21 through the inlet 37a flows in the case axial direction. A portion of the casing 21 located on the second side with respect to the valve cylinder 82 in the case axial direction constitutes a connection flow path 92 communicating with the flow passage 91.

In the valve cylinder 82, a radiator communication port 95 that penetrates the valve cylinder 82 in the case radial direction is formed at the same position in the case axial direction as the radiator outlet 41b described above. In a case where at least a portion of the radiator communication port 95 overlaps the sliding ring 131 inserted into the radiator outlet 41b when viewed from the case radial direction, the radiator outlet 41b and the inside of the flow passage 91 communicate with each other through the radiator communication port 95.

In the valve cylinder 82, a warm-up communication port 96 that penetrates the valve cylinder 82 in the case radial direction is formed at the same position as the warm-up outlet 56a in the case axial direction. In a case where at least a portion of the warm-up communication port 96 overlaps the sliding ring 131 inserted into the warm-up outlet 56a when viewed from the case radial direction, the warm-up outlet 56a and the inside of the flow passage 91 communicate with each other through the warm-up communication port 96.

In the valve cylinder 82, an air conditioning communication port 97 that penetrates the valve cylinder 82 in the case radial direction is formed at the same position in the case axial direction as the air conditioning outlet 66a described above. In a case where at least a portion of the air conditioning communication port 97 overlaps the sliding ring 131 inserted into the air conditioning outlet 66a when viewed from the case radial direction, the air conditioning outlet 66a and the inside of the flow passage 91 communicate with each other through the air conditioning communication port 97.

The rotor 22 switches between communication and disconnection between the inside of the flow passage 91 and the outlets 41b, 56a, 66a as the rotor 22 rotates around the axis O1. The communication pattern between the outlet and the communication port can be set as appropriate. A layout of the outlet and the communication port can be switched according to the set communication pattern. At least some of the corresponding outlets and communication ports may be disposed at positions where they overlap in the case axial direction.

Subsequently, details of a connection portion of the warm-up port 56 and the warm-up joint 62 will be described. Since a connection portion between the radiator port 41 and the radiator joint 42 and a connection portion between the air conditioning port 66 and the air conditioning joint 68 have the same configuration as the connection portion between the warm-up port 56 and the warm-up joint 62, descriptions thereof are omitted.

Figure 5:
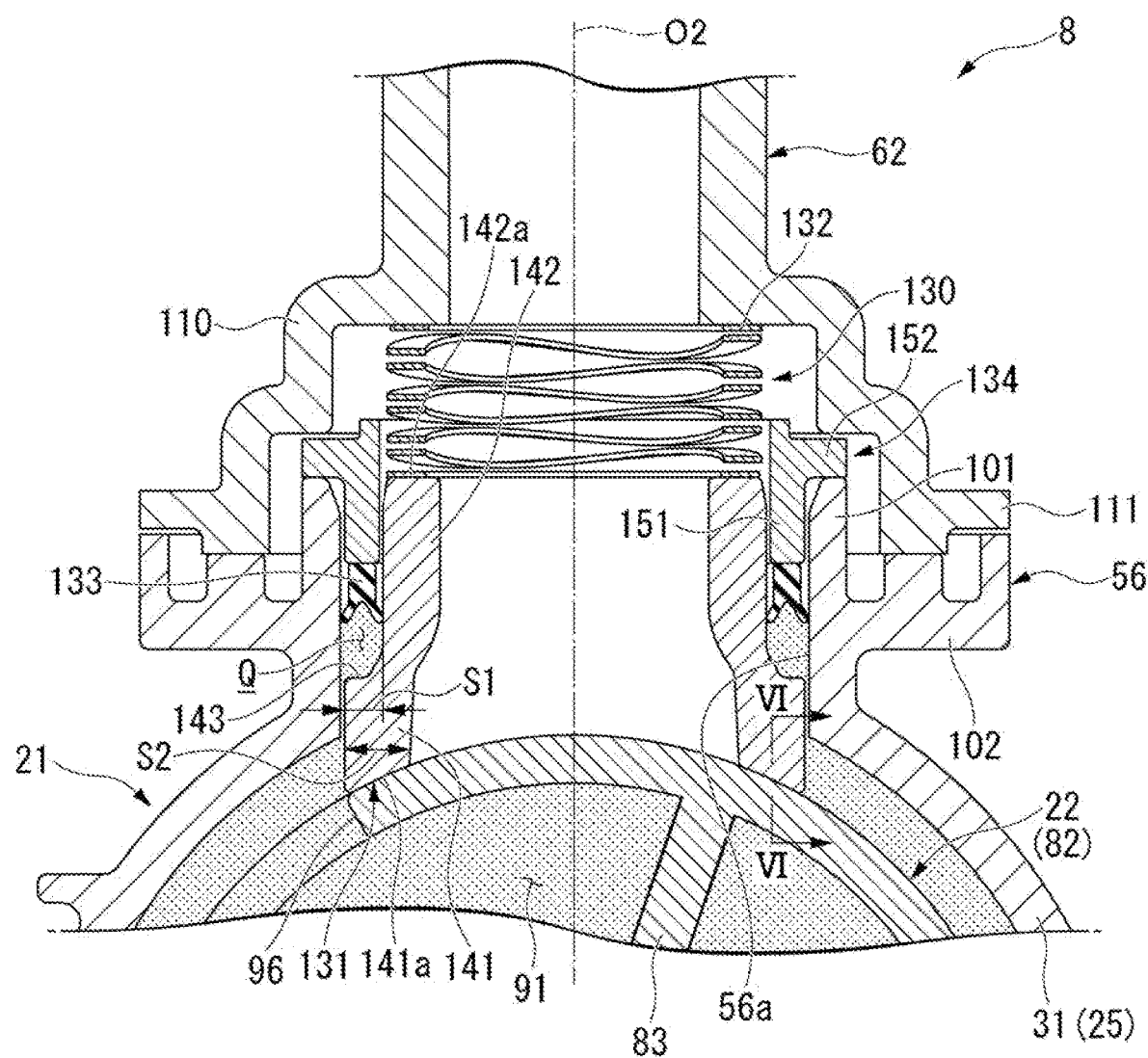
FIG. 5 is an enlarged view taken along line V-V of FIG. 2.

FIG. 5 is an enlarged cross-sectional view corresponding to line V-V of FIG. 2. In the following description, a direction along an axis O2 of the warm-up outlet 56a may be referred to as a port axial direction. In this case, in the port axial direction, a direction toward the axis O1 with respect to the warm-up port 56 is referred to as an inside, and a direction away from the axis O1 with respect to the warm-up port 56 is referred to as an outside. A direction orthogonal to the axis O2 may be referred to as a port radial direction, and a direction around the axis O2 may be referred to as a port circumferential direction.

As shown in FIG. 5, the warm-up port 56 has a seal cylinder 101 extending in the port axial direction and a port flange 102 protruding outward from the seal cylinder 101 in the port radial direction. The inside of the seal cylinder 101 constitutes the warm-up outlet 56a described above.

The warm-up joint 62 has a joint cylinder 110 disposed coaxially with the axis O2, and a joint flange 111 protruding outward in the port radial direction from an inner end portion of the joint cylinder 110 in the port axial direction.

The joint flange 111 is formed in an annular shape having an outer diameter equivalent to that of the port flange 102 and an inner diameter larger than an outer diameter of the seal cylinder 101. The joint flange 111 is joined to the port flange 102 by vibration welding or the like.

In the present embodiment, a seal mechanism 130 is provided in the portion surrounded by the warm-up port 56 and the warm-up joint 62. The seal mechanism 130 includes a sliding ring 131, a biasing member 132, a seal ring 133, and a holder 134. As shown in FIG. 3, a seal mechanism 130 having the same configuration as the seal mechanism 130 provided in the warm-up port 56 is also provided in each of the radiator port 41 and the air conditioning port 66. The seal mechanism 130 provided in each of the radiator port 41 and the air conditioning port 66 is designated by the same reference numerals as the seal mechanism 130 provided in the warm-up port 56, and descriptions thereof will be omitted.

As shown in FIG. 5, the sliding ring 131 is inserted into the warm-up outlet 56*a*. The sliding ring 131 extends coaxially with the axis O2 and is formed in a multi-stage tubular shape of which an outer diameter decreases stepwise toward the outside in the port axial direction. Specifically, the sliding ring 131 has a large-diameter portion 141 located inside in the port axial direction and a small-diameter portion 142 connected to the outside in the port axial direction with respect to the large-diameter portion 141.

An outer peripheral surface of the large-diameter portion 141 is configured to be slidable on an inner peripheral surface of the seal cylinder 101. The large-diameter portion 141 is restricted from moving in the port radial direction with respect to the warm-up port 56 by the seal cylinder 101. An inner end surface of the large-diameter portion 141 in the port axial direction constitutes a sliding surface 141*a* that slides on the outer peripheral surface of the valve cylinder 82. The sliding surface 141*a* is a curved surface formed following a radius of curvature of the valve cylinder 82.

An outer peripheral surface of the small-diameter portion 142 is connected to the outer peripheral surface of the large-diameter portion 141 via a stepped surface 143. The stepped surface 143 is inclined outward in the port radial direction toward the inside in the port axial direction, and then further extends outward in the port radial direction. A seal gap Q is provided in the port radial direction between the outer peripheral surface of the small-diameter portion 142 and the inner peripheral surface of the seal cylinder 101.

The inner peripheral surface of the small-diameter portion 142 is smoothly connected to the inner peripheral surface of the large-diameter portion 141. An outer end surface (hereinafter, referred to as "seat surface 142*a*") of the small-diameter portion 142 in the port axial direction is formed to have a flat surface orthogonal to the port axial direction. The seat surface 142*a* of the small-diameter portion 142 is disposed at a position equivalent to the outer end surface of the seal cylinder 101 in the port axial direction. The sliding ring 131 is separated from the warm-up joint 62 in the port radial direction and the port axial direction.

The biasing member 132 is disposed between the seat surface 142*a* of the sliding ring 131 and the warm-up joint 62. The biasing member 132 is, for example, a wave spring. The biasing member 132 biases the sliding ring 131 inward in the port axial direction (toward the valve cylinder 82).

The seal ring 133 is, for example, a Y packing. The seal ring 133 surrounds the sliding ring 131 (small-diameter portion 142) in a state where an opening portion (bifurcated portion) faces inward in the port axial direction. In a state where the seal ring 133 is disposed in the seal gap Q, each tip portion of the bifurcated portion is slidably in close contact with each of the outer peripheral surface of the small-diameter portion 142 and the inner peripheral surface of the seal cylinder 101. In the seal gap Q, a hydraulic pressure of the casing 21 is introduced into the inner region in the port axial direction with respect to the seal ring 133 through between the inner peripheral surface of the seal cylinder 101 and the sliding ring 131. The stepped surface 143 constitutes a pressure receiving surface that faces the sliding surface 141*a* on the sliding ring 131 in the port axial direction, receives a hydraulic pressure of the cooling water in the casing 21, and is pressed inward in the port axial direction.

The holder 134 is configured to be movable in the port axial direction with respect to the warm-up port 56 and the warm-up joint 62 in the seal gap Q. The holder 134 has a holder cylinder 151 and a holder flange 152.

The holder cylinder 151 extends in the port axial direction. The holder cylinder 151 is inserted into the seal gap Q from the outside in the port axial direction. The holder cylinder 151 restricts the movement of the seal ring 133 to the outside in the port axial direction by abutting a bottom portion of the seal ring 133.

The holder cylinder 151 surrounds the peripheries of the small-diameter portion 142 and the biasing member 132 in a state of straddling the small-diameter portion 142 and the biasing member 132 in the port axial direction.

The holder flange 152 protrudes from the outer end portion of the holder cylinder 151 in the port axial direction to the outer side in the port radial direction. The holder flange 152 is disposed between the seal cylinder 101 and the joint cylinder 110.

Here, in the sliding ring 131, an area S1 of the stepped surface 143 and an area S2 of the sliding surface 141*a* are set so as to satisfy the following Equations (1) and (2).

$$S1 < S2 \leq S1/k \quad (1)$$

$$\alpha \leq k < 1 \quad (2)$$

k: Pressure reduction constant of cooling water flowing through a minute gap between the sliding surface 141*a* and the valve cylinder 82

α: Lower limit value of pressure reduction constant determined by the physical properties of cooling water The area S1 of the stepped surface 143 and the area S2 of the sliding surface 141*a* mean an area when projected in the port axial direction.

α in Equation (2) is a standard value of the pressure reduction constant determined by the type of cooling water, a usage environment (for example, temperature), and the like. For example, under normal use conditions, $\alpha = \frac{1}{2}$ in the case of water. When the physical properties of the cooling water used change, it changes to $\alpha = \frac{1}{3}$ or the like.

The pressure reduction constant k in Equation (2) becomes a (for example, $\frac{1}{2}$) which is a standard value of the pressure reduction constant when the sliding surface 141*a* is uniformly in contact with the valve cylinder 82 from the outer edge to the inner edge in the port radial direction. However, due to manufacturing errors, assembly errors, or the like of the sliding ring 131, the gap between the outer peripheral portion of the sliding surface 141*a* and the valve cylinder 82 slightly increases with respect to the inner peripheral portion of the sliding surface 141*a*. In this case, the pressure reduction constant k in Equation (2) gradually approaches k=1.

In the present embodiment, assuming that there is a minute gap between the sliding surface 141*a* of the sliding ring 131 and the outer peripheral surface of the valve cylinder 82 to allow sliding, a relationship between the areas S1 and S2 of the stepped surface 143 and the sliding surface 141*a* is determined by Equations (1) and (2).

That is, the pressure of the cooling water in the casing 21 acts on the stepped surface 143 of the sliding ring 131 as it is. The pressure of the cooling water in the casing 21 does not act on the sliding surface 141*a* as it is. The pressure of the cooling water acts with a decrease in pressure when the cooling water flows from the outer edge to the inner edge in the port radial direction through a minute gap between the sliding surface 141*a* and the valve cylinder 82. In this case, the pressure of the cooling water gradually decreases toward the inside in the port radial direction and tries to push up the sliding ring 131 toward the outside in the port axial direction.

As a result, a force obtained by multiplying the area S1 of the stepped surface 143 by the pressure P in the casing 21 acts on the stepped surface 143 of the sliding ring 131 as it is. A force obtained by multiplying the area S2 of the sliding surface 141a by the pressure P in the casing 21 and the pressure reduction constant k acts on the sliding surface 141a of the sliding ring 131.

As is clear from Equation (1), the areas S1 and S2 of the control valve 8 of the present embodiment are set so that k×S2≤S1 is satisfied. Therefore, a relationship of P×k×S2≤P×S1 is also satisfied.

Therefore, a force F1 (F1=P×S1) in a pressing direction acting on the stepped surface 143 of the sliding ring 131 is larger than a force F2 (F2=P×k×S2) in a lifting direction acting on the sliding surface 141a of the sliding ring 131. Therefore, in the control valve 8 of the present embodiment, the sealing between the sliding ring 131 and the valve cylinder 82 can be realized only by the relationship of the pressure of the cooling water in the casing 21.

In the present embodiment, the area S1 of the stepped surface 143 of the sliding ring 131 is smaller than the area S2 of the sliding surface 141a. Therefore, even when the pressure of the cooling water in the casing 21 increases, it is possible to prevent the sliding surface 141a of the sliding ring 131 from being pressed against the valve cylinder 82 by an excessive force. Therefore, when the control valve 8 of the present embodiment is adopted, it is possible to avoid increasing the size and output of the drive unit 23 that rotationally drives the rotor 22, and premature wear of the sliding ring 131 and the bushes 78 and 84 (refer to FIG. 4) can be suppressed.

As described above, in the present embodiment, the area S2 of the sliding surface 141a is set to be larger than the area S1 of the stepped surface 143 within a range in which the pressing force inward in the port axial direction acting on the sliding ring 131 does not fall below the lifting force outward in the port axial direction acting on the sliding ring 131. Therefore, it is possible to seal between the sliding ring 131 and the valve cylinder 82 while suppressing the pressing of the sliding ring 131 against the valve cylinder 82 by an excessive force.

Figure 6:
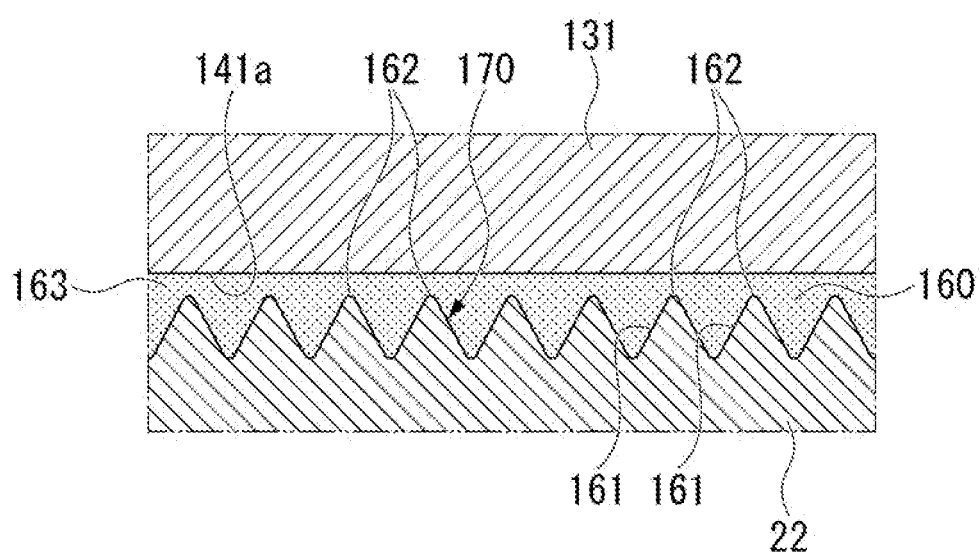
FIG. 6 is an enlarged view of a cross section taken along line VI-VI of FIG. 5.
Figure 7:
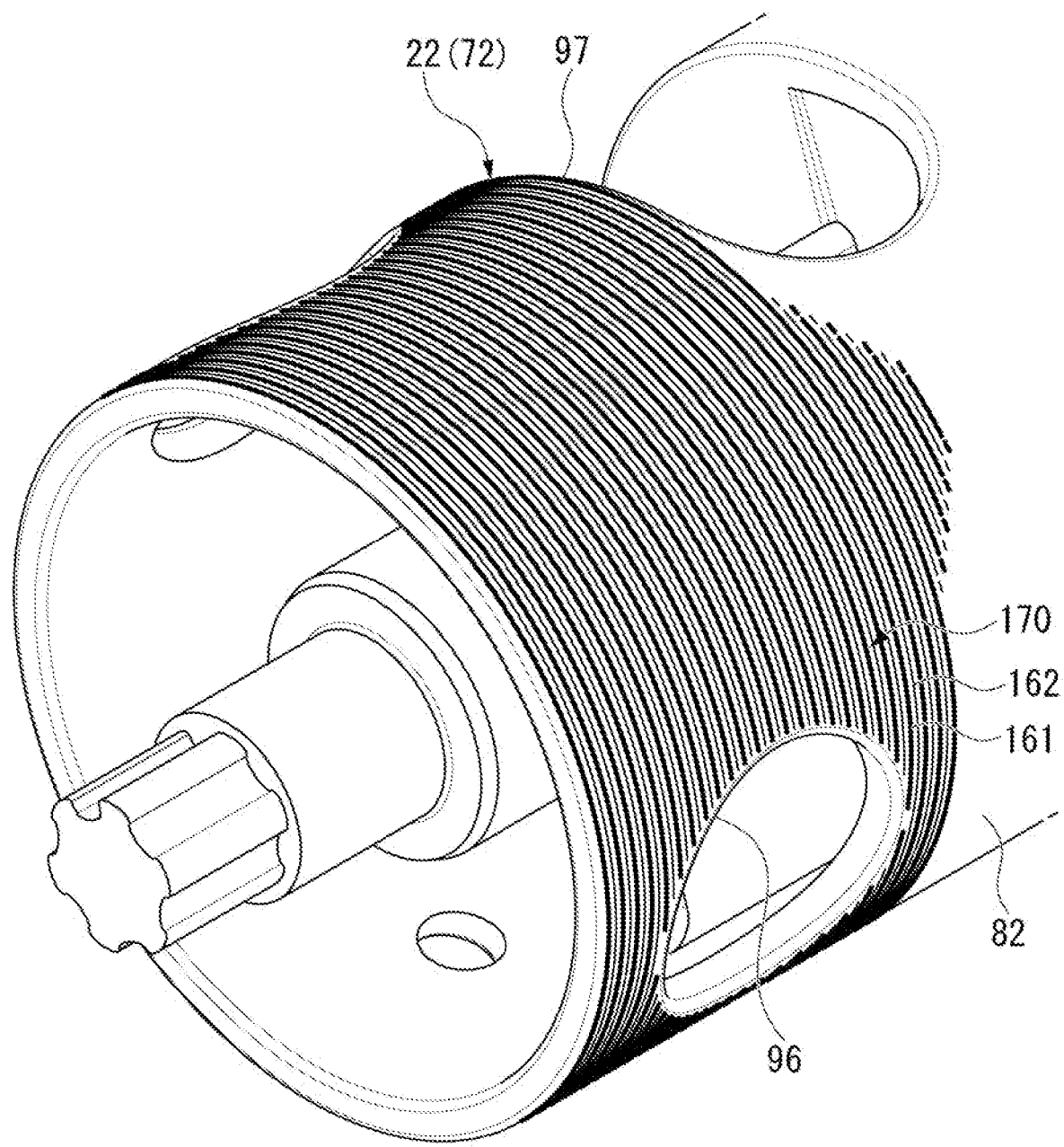
FIG. 7 is a partially enlarged view of the control valve according to the embodiment.

FIG. 6 is an enlarged view of a cross section taken along line VI-VI of FIG. 5. FIG. 7 is a partially enlarged view showing the outer peripheral surface of the rotor 22 (valve cylinder 82) included in the control valve 8 according to the embodiment.

As shown in FIGS. 6 and 7, a liquid holding portion 160 is provided on the outer peripheral surface (outer surface) of the valve cylinder 82 included in the rotor 22. The liquid holding portion 160 holds cooling water between the sliding ring 131 and the sliding surface 141a.

The liquid holding portion 160 has a recessed portion 161 for accommodating the cooling water and a liquid interposing portion 162 in which the cooling water is interposed. The liquid holding portion 160 may be provided at least a surface (an overlapping portion viewed from the case radial direction) of the outer peripheral surface of the valve cylinder 82 that passes through the radiator outlet 41b, the warm-up outlet 56a, and the air conditioning outlet 66a when the rotor 22 rotates.

The recessed portion 161 is recessed inward in the case radial direction with respect to the outer peripheral surface of the valve cylinder 82. In the present embodiment, the recessed portion 161 includes a groove 170 extending spirally on the outer peripheral surface of the valve cylinder 82. The groove 170 is formed by lathe processing or the like on the outer peripheral surface of the valve cylinder 82. The groove 170 extends to the first side in the case axial direction toward one side in the case circumferential direction.

The recessed portion 161 is a portion of the opening portion of the groove 170 that appears on the same cross section when the valve cylinder 82 is cut along the case axial direction. That is, a plurality of recessed portions 161 are arranged in the case axial direction in a cross-sectional view along the case axial direction. Each recessed portion 161 is formed in a triangular shape, for example, in a cross-sectional view along the case axial direction. A dimension of the recessed portion 161 in the case axial direction is sufficiently smaller than the sliding surface 141a. In the recessed portion 161, a ratio between the dimension in the case axial direction and the dimension in the case radial direction can be appropriately changed.

The liquid interposing portion 162 is a portion of the valve cylinder 82 located between the adjacent recessed portions 161 in the case axial direction. In the present embodiment, the liquid interposing portion 162 constitutes the outer peripheral surface of the valve cylinder 82. In the shown example, the liquid interposing portions 162 are formed in a ridge shape extending along the case circumferential direction by being arranged adjacent recessed portion 161 without a gap in the case axial direction. The liquid interposing portions 162 may be formed in a band shape by being arranged adjacent recessed portion 161 with a gap between them.

In the outer peripheral surface of the valve cylinder 82, a surface roughness of the liquid holding portion 160 is defined as a rotor surface roughness $Rz_1$, and a surface roughness of the sliding surface 141a is defined as a ring surface roughness $Rz_2$. The rotor surface roughness $Rz_1$ is larger than the ring surface roughness $Rz_2$ ($Rz_1 > Rz_2$). Since the rotor surface roughness $Rz_1$ is larger than the ring surface roughness $Rz_2$, the sealing performance can be controlled by the rotor surface roughness $Rz_1$ of the rotor 22.

It is preferable that the rotor 22 (particularly, the outer peripheral surface of the valve cylinder 82) is harder than the sliding ring 131 (particularly, the sliding surface 141a). Generally, when the rotor 22 wears, the sealing performance is reduced. However, by having the rotor 22 having a structure harder than the sliding ring 131, it is possible to suppress the wear of the rotor 22 and maintain the sealing performance, and to maintain the roughness of the rotor 22 and keep the torque constant.

The sliding ring 131 preferably does not contain at least CF (fluorocarbon). This is because when the sliding ring 131 contains CF, wear of the rotor 22 is accelerated.

The rotor surface roughness $Rz_1$ and the ring surface roughness $Rz_2$ are ten-point average roughness Rz standardized in JIS B 0601.

The rotor surface roughness $Rz_1$ refers to the surface roughness of the outer peripheral surface of the rotor 22 in the case axial direction, and can be measured by, for example, a surface roughness/contour measuring device (model: SV-C3200H8, manufactured by Mitutoyo Co., Ltd.). The rotor surface roughness $Rz_1$ is set to the range of 45 μm or less (11 μm<X≤45 μm), which is larger than 11 μm in the ten-point average roughness Rz(X).

The ring surface roughness $Rz_2$ refers to the surface roughness of the sliding surface 141a of the sliding ring 131, and can be measured by, for example, a surface roughness/contour measuring device (model: SV-C3200H8, manufactured by Mitutoyo Co., Ltd.). The ring surface roughness $Rz_2$ is preferably set to 6.3 μm or less in terms of the ten-point average roughness Rz regardless of the value of the rotor surface roughness $Rz_1$. It is more preferable that the ring surface roughness $Rz_2$ is set to the range of 5 μm or less (1 μm<X≤5 μm), which is larger than 1 μm.

[Operation Method of Control Valve 8]

Next, an operation method of the control valve 8 described above will be described.

<Normal Operation>

As shown in FIG. 1, in the main flow path 10, the cooling water delivered by the water pump 3 is heat-exchanged by the engine 2 and then flows toward the control valve 8. As shown in FIG. 4, the cooling water that has passed through the engine 2 in the main flow path 10 flows into the connection flow path 92 in the casing 21 through the inlet 37a.

Of the cooling water that has flowed into the connection flow path 92, a portion of the cooling water flows into the EGR outlet 51. The cooling water that has flowed into the EGR outlet 51 is supplied into the EGR flow path 14 through the EGR joint 52. The cooling water supplied into the EGR flow path 14 is returned to the main flow path 10 after heat exchange between the cooling water and the EGR gas is performed in the EGR cooler 7.

Of the cooling water that has flowed into the connection flow path 92, the cooling water that has not flowed into the EGR outlet 51 flows into the flow passage 91 from the second side in the case axial direction. The cooling water that has flowed into the flow passage 91 is distributed to each outlet in the process of flowing in the flow passage 91 in the case axial direction. That is, the cooling water flowing into the flow passage 91 is distributed to the flow paths 11 to 13 through the outlet that communicates with the communication port among the outlets.

In the control valve 8, in order to switch the communication pattern between the outlet and the communication port, the rotor 22 is rotated around the axis O1. Then, by stopping the rotation of the rotor 22 at the position corresponding to the communication pattern to be set, the outlet and the communication port communicate with each other in the communication pattern corresponding to the stop position of the rotor 22.

<Zero-Flow State>

Subsequently, the operation of the cooling system 1 in a zero-flow state will be described. In the cooling system 1 of the present embodiment, the cooling system 1 is maintained in the zero-flow state from the start of driving the engine to the completion of warming up. In the zero-flow state, at least the communication between the radiator outlet 41b and the radiator communication port 95 is cut off (an opening degree of the radiator outlet 41b is set to 0%), and the cooling water stays in the radiator flow path 11. In the present embodiment, in the zero-flow state, only the inside of the connection flow path 92 and the inside of the EGR outlet 51 communicate with each other in a state where the water pump 3 is driven.

In the zero-flow state, the cooling water that has flowed into the connection flow path 92 flows into the EGR outlet 51. The cooling water that has flowed into the EGR outlet 51 is supplied into the EGR flow path 14 through the EGR joint 52.

In the zero-flow state, opening degrees of the outlets (radiator outlet 41b, warm-up outlet 56a, and air conditioning outlet 66a) other than the EGR outlet 51 are 0%. Therefore, the cooling water stays in the radiator flow path 11, the warm-up flow path 12, and the air conditioning flow path 13. Accordingly, heat exchange efficiency between the heat released from the engine and the cooling water in the radiator outlet 41b can be suppressed, and early warming up can be realized.

When the temperature of the cooling water (the temperature of the cooling water flowing into the inflow port 37) sent out from the water pump 3 reaches a predetermined temperature, it can be determined that the warm-up of the engine is completed. As a result, the cooling system 1 releases the zero-flow state and distributes the cooling water to each of the flow paths 11 to 13 as described above according to a state of the engine and a running state of the vehicle.

In order to realize early warming up, it is necessary to improve the sealing performance between the rotor 22 (valve cylinder 82) and the sliding ring 131 (sliding surface 141a).

In the present embodiment, the liquid holding portion 160 for holding cooling water between the outer peripheral surface of the valve cylinder 82 and the sliding surface 141a is provided on the outer peripheral surface of the valve cylinder 82.

According to this configuration, the cooling water that has entered the minute gap between the outer peripheral surface of the valve cylinder 82 and the sliding surface 141a is accommodated in the recessed portion 161. As a result, a liquid film 163 is likely to be formed between the outer peripheral surface of the valve cylinder 82 and the sliding surface 141a due to the influence of surface tension or the like acting between the liquid holding portion 160 and the sliding surface 141a. As a result, the liquid film 163 can seal between the rotor 22 and the sliding ring 131. Accordingly, the cooling water is less likely to leak to the inside of the sliding ring 131 through between the rotor 22 and the sliding ring 131. Therefore, according to the above embodiment, it becomes easy to maintain the zero-flow state of the cooling system 1, and it is possible to realize early warming up of the vehicle.

The area where the rotor 22 (valve cylinder 82) and the sliding ring 131 come into direct contact with each other can be reduced by the liquid film 163 formed between the rotor 22 and the sliding ring 131. Accordingly, it is possible to reduce the adhesion between the rotor 22 and the sliding ring 131 due to the recessed portion 161 of the liquid holding portion 160. Therefore, it is possible to reduce the sliding resistance of the rotor 22 during rotation and reduce the rotational torque. Therefore, it is possible to suppress an increase in the size of the actuator and an increase in power consumption.

Therefore, according to the above embodiment, it is possible to provide the control valve 8 that achieves both improvement of the sealing performance between the rotor 22 and the sliding ring 131 and ensuring sliding property between the rotor 22 and the sliding ring 131.

In the present embodiment, since the sealing performance and sliding property can be ensured by processing the recessed portion 161 on the outer peripheral surface of the valve cylinder 82, it is possible to improve durability as compared with the conventional configuration in which a sliding coating is applied to the outer peripheral surface of the rotor, for example. Therefore, the sealing performance and the sliding property can be ensured for a long period of time.

In the above embodiment, since the recessed portion 161 extends along the rotation direction (case circumferential direction) of the rotor 22, when the rotor 22 rotates, the top portion (liquid interposing portion 162) of the outer peripheral surface of the rotor 22 located between the adjacent recessed portions 161 moves along the case circumferential direction. That is, at any position of the sliding surface 141a, it is possible to prevent the recessed portion 161 and the liquid interposing portion 162 from alternately passing as the rotor 22 rotates. Therefore, abnormal wear of the sliding surface 141a can be suppressed.

In the above embodiment, the recessed portion 161 is formed by the groove 170 spirally extending to the first side in the case axial direction as extending to one side in the case circumferential direction on the outer peripheral surface of the valve cylinder 82.

According to this configuration, the recessed portion 161 can be easily formed on the outer peripheral surface of the valve cylinder 82 by performing lathe processing or the like on the valve cylinder 82 after injection molding. In particular, in the present embodiment, since the machining can be completed while the outer peripheral surface of the valve cylinder 82 is rougher than the conventional case, and thus, a cutting time can be reduced as compared with the case where the surface roughness of the outer peripheral surface of the valve cylinder 82 is reduced in order to improve the sealing performance. As a result, it is possible to improve the manufacturing efficiency and reduce the manufacturing cost.

In the above embodiment, since the rotor surface roughness $Rz_1$ of the rotor 22 is larger than the ring surface roughness $Rz_2$, the cooling water can be more reliably held in the liquid holding portion 160.

In the above embodiment, since the rotor surface roughness $Rz_1$ is in the range of 11 μm<X≤45 μm in terms of the ten-point average roughness Rz, it is possible to achieve both sealing performance and torque reduction.

Specifically, since the rotor surface roughness $Rz_1$ is larger than the above lower limit value, the sliding resistance acting between the rotor 22 and the sliding ring 131 can be reduced, and the rotational torque can be reduced. Since the rotor surface roughness $Rz_1$ is equal to or less than the upper limit value, the sealing performance between the rotor 22 and the sliding ring 131 can be ensured particularly in the zero-flow state (until the warm-up is completed).

In the above embodiment, the ring surface roughness $Rz_2$ is set to 6.3 μm or less in terms of the ten-point average roughness Rz.

According to this configuration, it is possible to achieve both improvement of the sealing performance between the rotor 22 and the sliding ring 131 and suppression of the wear between the rotor 22 and the sliding ring 131. In particular, by setting the ring surface roughness $Rz_2$ to a value sufficiently smaller than the rotor surface roughness $Rz_1$, wear of the outer peripheral surface of the rotor 22 can be suppressed. As a result, the rotor surface roughness $Rz_1$ can be maintained in a desired range for a long period of time, and it is easy to secure the sealing performance.

Figure 8:
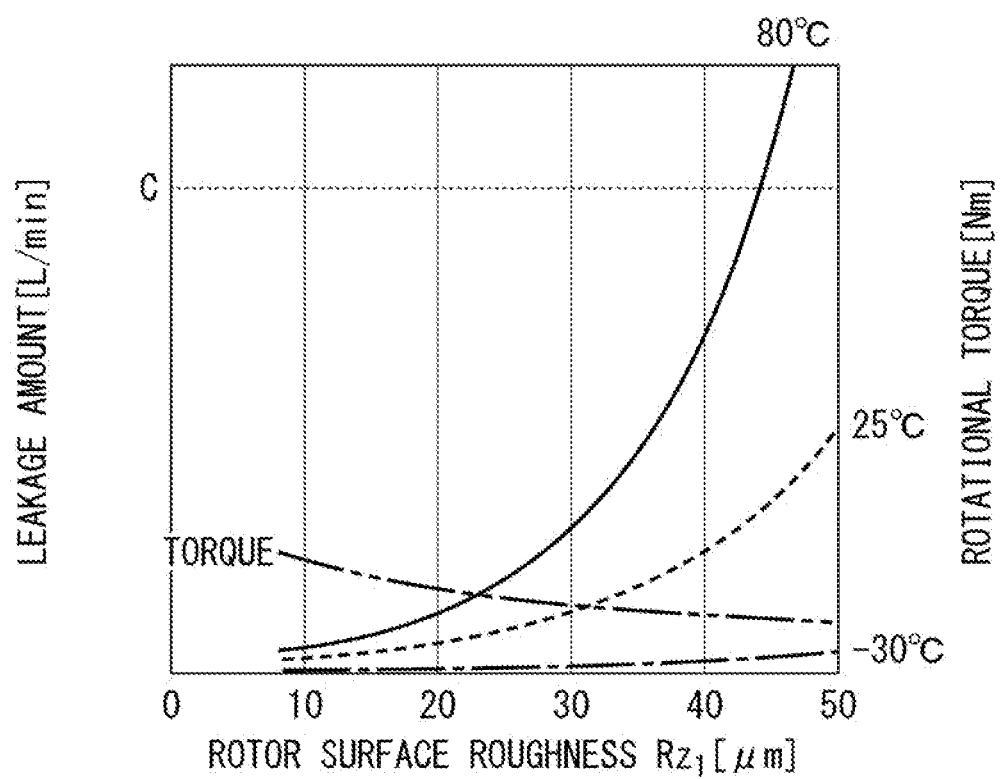
FIG. 8 is a graph showing changes in a "leakage amount" and a "rotational torque" when a rotor surface roughness is changed.

FIG. 8 is a graph showing changes in a "leakage amount" and a "rotational torque" when the rotor surface roughness $Rz_1$ at a standard pressure is changed. The inventor of the present application conducted a test to verify the sealing performance and sliding property between the rotor 22 (valve cylinder 82) and the sliding ring 131 (sliding surface 141a) due to the difference in the rotor surface roughness $Rz_1$.

The "rotor surface roughness $Rz_1$" on a horizontal axis of the graph is the ten-point average roughness Rz standardized in JIS B 0601. The "rotor surface roughness $Rz_1$" is a value measured by a surface roughness/contour measuring device (model: SV-C3200H8, manufactured by Mitutoyo Co., Ltd.). In this test, the ring surface roughness $Rz_2$ was set to, for example, 6.3 μm or less as a range that does not affect the wear of the rotor 22.

The "leakage amount" shown on a left vertical axis of the graph is the measured value when the temperature of the cooling water is set to −30° C. (low temperature), 25° C. (normal temperature), and 80° C. (general warm-up completion temperature). The measurement is performed using a memory high coder (model: 860-50, manufactured by Hioki Electric Co., Ltd.) and a 16ch scanner unit (model name: 8958, manufactured by Hioki Electric Co., Ltd.).

The "rotational torque" shown on a right vertical axis of the graph is the rotational torque of the rotor 22 at the standard pressure. The measurement is performed using a rotational torque meter (model: UTMII-2 Nm, manufactured by Unipulse Corporation).

The above "standard pressure" is the maximum pressure in the running test performed in the running pattern for fuel consumption measurement, and indicates a discharge pressure (pressure of the cooling water flowing into the inflow port 37) of the cooling water fed out from the water pump 3.

Regarding the relationship between the rotor surface roughness $Rz_1$ and the leakage amount, the leakage amount tends to increase as the rotor surface roughness $Rz_1$ increases. That is, the rougher the surface of the rotor 22, the greater the leakage amount. It is considered that this is because a gap is likely to occur between the outer peripheral surface of the valve cylinder 82 and the sliding surface 141a. As shown in FIG. 8, when the temperature of the cooling water is 80° C., viscosity of the cooling water decreases, and thus, the cooling water easily flows. As a result, when the rotor surface roughness $Rz_1$ becomes larger than 45 the leakage amount increases to a predetermined specified value C or more, and it becomes difficult to effectively maintain the zero-flow state.

Regarding the relationship between the rotor surface roughness $Rz_1$ and the rotational torque, the rotational torque tends to increase as the value of the rotor surface roughness $Rz_1$ decreases. It is considered that the smoother the surface of the rotor 22, the closer the rotor 22 and the sliding ring 131 are, and the larger the frictional force is, and thus, the torque when the rotor 22 rotates increases. When the rotor surface roughness $Rz_1$ is 11 μm or less, the torque cannot be suppressed to a desired torque, resulting in an increase in power consumption and the like.

In the tendencies of the sealing performance and the sliding property due to the difference in the rotor surface roughness $Rz_1$, absolute values thereof were different depending on the measured temperature of the cooling water, but the same tendency was obtained regardless of the measured temperature. That is, as the temperature of the cooling water decreases, the viscosity of the cooling water increases. Therefore, when comparing the temperatures of the cooling water (−30° C., 25° C., and 80° C.) in the graph shown in FIG. 8, the leakage amount tends to decrease as the temperature of the cooling water decreases.

In the tendencies of the sealing performance and the sliding property due to the difference in the rotor surface roughness $Rz_1$, the absolute values thereof were different depending on the pressure of the cooling water (discharge pressure of the water pump 3), but the same tendency was obtained regardless of the measured pressure. That is, as the pressure of the cooling water increases, the pressure acting between the outer peripheral surface of the valve cylinder 82 and the sliding surface 141a increases, and thus, the leakage amount tends to increase. When the pressure of the cooling water increases, the force F1 in the pressing direction acting on the stepped surface 143 of the sliding ring 131 increases, and thus, the frictional force acting on between the outer peripheral surface of the valve cylinder 82 and the sliding surface 141a of the sliding ring 131 increases, and the sliding resistance increases.

Based on the above results, in the present embodiment, the rotor surface roughness $Rz_1(X)$ is preferably in the range of 11 µm<X≤45 µm in terms of the ten-point average roughness Rz. When the rotor surface roughness $Rz_1$ is within the above range, it is possible to achieve both improvement of the sealing performance between the rotor 22 and the sliding ring 131 and suppression of wear between the rotor 22 and the sliding ring 131.

The improvement of the sealing performance between the rotor 22 and the sliding ring 131 and the suppression of wear between the rotor 22 and the sliding ring 131 are effectively exerted in various temperature ranges and pressure ranges of the cooling water. Therefore, more preferably, the rotor surface roughness $Rz_1(X)$ is in a range larger than 25 µm and equal to or less than 44 µm (25 µm<X≤44 µm), and still more preferably, in a range larger than 25 µm and equal to or less than 38 µm (25 µm<X≤38 µm). In particular, by setting the rotor surface roughness $Rz_1$ to 38 µm or less, the sealing performance can be further secured, the cooling water can be supplied only to the desired flow path at the desired timing, and the fuel consumption can be reduced.

In addition, it is possible to replace the components in the above-described embodiment with well-known components as appropriate without departing from the spirit of the present disclosure, and the above-mentioned embodiments are included with various modifications.

In the above-described embodiment, the cooling water is used as the liquid, but the present invention is not limited to this. For example, water, a solution, or the like may be used as the liquid.

In the present embodiment, the case where the recessed portion 161 is composed of the groove 170 spirally extending on the outer peripheral surface of the valve cylinder 82 has been described, but the present invention is not limited to this. The recessed portion 161 may be formed by a groove extending linearly in the case circumferential direction on the outer peripheral surface of the valve cylinder 82. The recessed portion 161 may be formed by a groove extending in a wavy shape on the outer peripheral surface of the valve cylinder 82. The recessed portion 161 may be a discontinuous recessed portion provided on the outer peripheral surface of the valve cylinder 82. That is, the recessed portions 161 may be arranged in an island shape at intervals in the case axial direction and the case circumferential direction.

In the above-described embodiment, the case where the recessed portion 161 is formed on the outer peripheral surface of the valve cylinder 82 by cutting such as lathe processing has been described, but the present invention is not limited to this configuration. The recessed portion 161 may be formed by a method other than cutting, such as sandblasting or etching.

In the above-described embodiment, the configuration in which the recessed portion 161 is formed in a triangular shape, for example, in a cross-sectional view along the case axial direction has been described, but the present invention is not limited to this. The recessed portion 161 may be formed in a semicircular shape, a rectangular shape, or the like in a cross-sectional view along the case axial direction.

In the above-described embodiment, the configuration in which the cooling water flowing into the control valve 8 is distributed to the radiator flow path 11, the warm-up flow path 12, the air conditioning flow path 13, and the EGR flow path 14 has been described, but the present invention is not limited to only this configuration. The control valve 8 may be configured to distribute the cooling water flowing into the control valve 8 to at least two flow paths.

The layout, type, shape, or the like of each communication port and outlet can be changed as appropriate.

In the above-described embodiment, the configuration in which the valve cylinders 82 of the rotor 22 are open on both sides in the case axial direction has been described, but the present invention is not limited to only this configuration. The design of the rotor 22 can be appropriately changed as long as the cooling water can enter the valve cylinder 82. For example, the rotor 22 may have a closed portion that closes both end opening portions of the valve cylinder 82 in the case axial direction. In this case, a communication port or the like may be formed in the closed portion so that the inside and outside of the rotor 22 can communicate with each other in the case axial direction. Also in this case, the liquid holding portion 160 may be provided on the surface (the outer surface of the rotor 22) of the closed portion facing the sliding surface 141a.

In the above-described embodiment, the case where the rotor 22 (valve cylinder 82) and the casing 21 (peripheral wall portion 31) are each formed in a cylindrical shape (a uniform diameter over the entire case axial direction) has been described, but the present invention is not limited to only this configuration. When the valve cylinder 82 is configured to be rotatable in the peripheral wall portion 31, an outer diameter of the valve cylinder 82 and an inner diameter of the peripheral wall portion 31 may be changed in the case axial direction. In this case, for example, the valve cylinder 82 and the peripheral wall portion 31 can adopt various shapes such as a spherical shape (a shape of which a diameter decreases from the central portion toward both end portions in the case axial direction), a shape in which a plurality of spherical portions are continuous in the case axial direction, a tapered shape (a shape of which a diameter is gradually changed from the first side to the second side in the case axial direction), and a stepped shape (a shape of which a diameter is changed stepwise from the first side to the second side in the case axial direction).

EXPLANATION OF REFERENCES

8: control valve
21: casing
22: rotor
85: rotating shaft
131: sliding ring
141a: sliding surface
160: liquid holding portion
161: recessed portion
162: liquid interposing portion

What is claimed is:
1. A control valve comprising:
a casing in which an outlet for a liquid is formed and the liquid is accommodated;
a rotor having a communication port communicatable with the outlet and rotatably accommodated in the casing; and
a sliding ring having a sliding surface sliding on an outer surface of the rotor in a state of being disposed in the outlet and causing the outlet and the communication port to communicate with each other according to a rotation position of the rotor,
wherein
a liquid holding portion for holding the liquid between the sliding surface and the liquid holding portion is provided on the outer surface of the rotor, the liquid holding portion has a recessed portion for accommodating the liquid, the rotor is formed in a tubular shape extending coaxially with the rotation axis, a groove extending spirally in an axial direction along the rotation axis as the groove extends to one side in the circumferential direction is formed on an outer peripheral surface of the rotor, and the groove is formed by arranging a plurality of the recessed portions in the axial direction in a cross-sectional view along the axial direction.

2. The control valve according to claim 1, wherein when a surface roughness of the outer surface is defined as a rotor surface roughness and a surface roughness of the sliding surface is defined as a ring surface roughness, the rotor surface roughness is larger than the ring surface roughness.

3. A control valve comprising:

a casing in which an outlet for a liquid is formed and the liquid is accommodated;

a rotor having a communication port communicatable with the outlet and rotatably accommodated in the casing; and a sliding ring having a sliding surface sliding on an outer surface of the rotor in a state of being disposed in the outlet and causing the outlet and the communication port to communicate with each other according to a rotation position of the rotor, wherein a liquid holding portion for holding the liquid between the sliding surface and the liquid holding portion is provided on the outer surface of the rotor, the liquid holding portion has a recessed portion for accommodating the liquid, and when a surface roughness of the outer surface is defined as a rotor surface roughness and a surface roughness of the sliding surface is defined as a ring surface roughness, the rotor surface roughness is larger than the ring surface roughness.

4. The control valve according to claim 3, wherein the rotor surface roughness is in a range of 11 µm<X≤45 µm in terms of ten-point average roughness Rz.

* * * * *